(12) United States Patent
Lin et al.

(10) Patent No.: US 7,468,286 B1
(45) Date of Patent: Dec. 23, 2008

(54) SYSTEM AND METHOD FOR SECURING OPTOELECTRONIC PACKAGES FOR MOUNTING COMPONENTS AT A MOUNTING ANGLE

(75) Inventors: Kai-Sheng Lin, Sugar Land, TX (US); Chian-Hung Chen, Sugar Land, TX (US); Limin Chen, Houston, TX (US)

(73) Assignee: Applied Optoelectronics, Inc., Sugar Land, TX (US)

( * ) Notice: Subject to any disclaimer, the term of this patent is extended or adjusted under 35 U.S.C. 154(b) by 0 days.

(21) Appl. No.: 11/867,114

(22) Filed: Oct. 4, 2007

(51) Int. Cl.
*H01L 21/00* (2006.01)
*G02B 6/42* (2006.01)
(52) U.S. Cl. .............................. 438/31; 385/52; 257/680
(58) Field of Classification Search .................. 438/31; 257/680; 385/25, 52
See application file for complete search history.

(56) References Cited

U.S. PATENT DOCUMENTS

| | | | |
|---|---|---|---|
| 6,813,406 B2 * | 11/2004 | Hatam-Tabrizi et al. | 385/16 |
| 6,985,281 B2 * | 1/2006 | Wagner et al. | 359/315 |
| 7,229,218 B2 * | 6/2007 | Morris et al. | 385/89 |
| 7,236,680 B1 * | 6/2007 | Jordan | 385/147 |
| 2004/0052468 A1 * | 3/2004 | Pham et al. | 385/52 |
| 2007/0047876 A1 * | 3/2007 | Kwan et al. | 385/52 |

* cited by examiner

*Primary Examiner*—W. David Coleman
(74) *Attorney, Agent, or Firm*—N. Stephan Kinsella; Grossman, Tucker, Perreault & Pfleger, PLLC

(57) ABSTRACT

A system and method for holding optoelectronic packages may be used to secure one or more optoelectronic packages for mounting one or more components at a mounting angle (i.e., an intermediate angle between 0° and 90°). The system may include one or more fixtures configured to pivot from a non-angled position to a single fixed angled position. According to exemplary embodiments, fixtures may be configured to secure a TO can type package while one or more components, such as photodetectors, are mounted to the TO can type package, for example, by bonding. The TO can type package may be a TO can laser package including a monitor photodetector or a TO can photodetector package. Of course, many alternatives, variations and modifications are possible without departing from this embodiment.

22 Claims, 5 Drawing Sheets

SYSTEM AND METHOD FOR SECURING OPTOELECTRONIC PACKAGES FOR MOUNTING COMPONENTS AT A MOUNTING ANGLE

TECHNICAL FIELD

The present disclosure relates to optoelectronic packaging and in particular, to a system, apparatus and method for securing an optoelectronic package for mounting components at a mounting angle.

BACKGROUND INFORMATION

The following descriptions and examples are not admitted to be prior art by virtue of their inclusion within this section.

Certain optoelectronic packages include components that are mounted at an angle (i.e., a mounting angle) relative to other components or mounting surfaces in the optoelectronic package. One such angled component is a photodetector. The term photodetector generally refers to any type of radiation detector that detects electromagnetic radiation. One type of photodetector is a two-layer junction photodetector, or photodiode, which has a semiconductor p-n junction that produces electrical current under illumination with electromagnetic radiation. A photodetector may be used in a laser package (e.g., in an optical transmitter) to monitor light being emitted from a laser and coupled into an optical fiber. A photodetector may also be used in a photodetector package (e.g., in an optical receiver) to receive and detect light exiting an optical fiber.

In a laser package, for example, the photodetector is commonly provided in the same package as the laser to function as a check device to verify the proper operation of the laser. This photodetector is sometimes referred to as a "monitor photodetector" or "monitor photodiode," due to its function in monitoring the output power of the laser. In such laser packages, a fiber may be mounted to receive the primary laser light output from a laser diode and a photodiode may be mounted to receive the small portion of light emitted from the back of the laser diode. This photodiode may be mounted at an intermediate angle between 0° and 90° relative to the emitted light because an angle of 0° may detect too little light and an angle of 90° may cause excessive back reflection. Likewise, a photodiode may be mounted at an angle within a photodetector package in a receiver so that the light output from the output end of the fiber is directed onto the active or light-receiving region of the surface of the photodiode.

One example of an optoelectronic package is a TO (transistor outline) can type package, which may be used to align and position the photodetector, laser, fiber, and/or related optical components. Other optical components may include collimation and coupling lenses, isolators, and the like to optically couple the laser or photodiode to the fiber. These components may be mounted in the TO can package (e.g., to the TO can post and/or header), and an optical fiber may be aligned with the components and coupled to the package (e.g., sometimes referred to as fiber pigtailing). As mentioned above, some of these components (e.g., the photodetector) may be mounted at a mounting angle (e.g., between 0° and 90° in the TO can package, while other components are not angled (i.e., a mounting angle of 0°).

To mount the components (e.g., laser diodes, photodiodes, lenses, and the like) in the proper locations with the desired mounting angles, the optoelectronic package may be first secured in a fixture. A pick and place machine may then precisely position the components in the appropriate mounting location within the package for bonding to the mounting surface. Mounting components at an angle using these machines presents unique challenges because the pick and place machines generally position components straight into the package (i.e., not at an intermediate mounting angle). Existing fixtures are configured to secure TO can packages and to angle the packages to allow certain components to be bonded at an intermediate mounting angle; however, these fixtures suffer from a number of drawbacks. In particular, some existing fixtures use a screw to provide angular adjustment to position the package at the desired angle, which is slow and creates problems at the production line. Existing fixtures also use a vacuum to hold the TO can package in place, which requires O-ring seals and may leak under certain conditions. Existing fixtures also do not allow the TO can packages to be easily unloaded, which may result in damage to the package.

BRIEF DESCRIPTION OF THE DRAWINGS

These and other features and advantages will be better understood by reading the following detailed description, taken together with the drawings wherein.

DETAILED DESCRIPTION

Generally, a system and method for holding optoelectronic packages, consistent with the present disclosure, may be used to secure one or more optoelectronic packages for mounting one or more components at a mounting angle (i.e., an intermediate angle between 0 and 90°). As described in greater detail below, the system may include one or more fixtures configured secure the optoelectronic package(s) and to pivot from a non-angled position to a single, fixed angled position to facilitate mounting the components at the mounting angle. According to exemplary embodiments described herein, fixtures may be configured to secure a TO can type package while one or more components, such as photodetectors, are mounted to the TO can type package, for example, by bonding. The TO can type package may be a TO can laser package including a monitor photodetector or a TO can photodetector package. The system and method described herein may also be configured to secure other types of optoelectronic packages.

Figure 1:
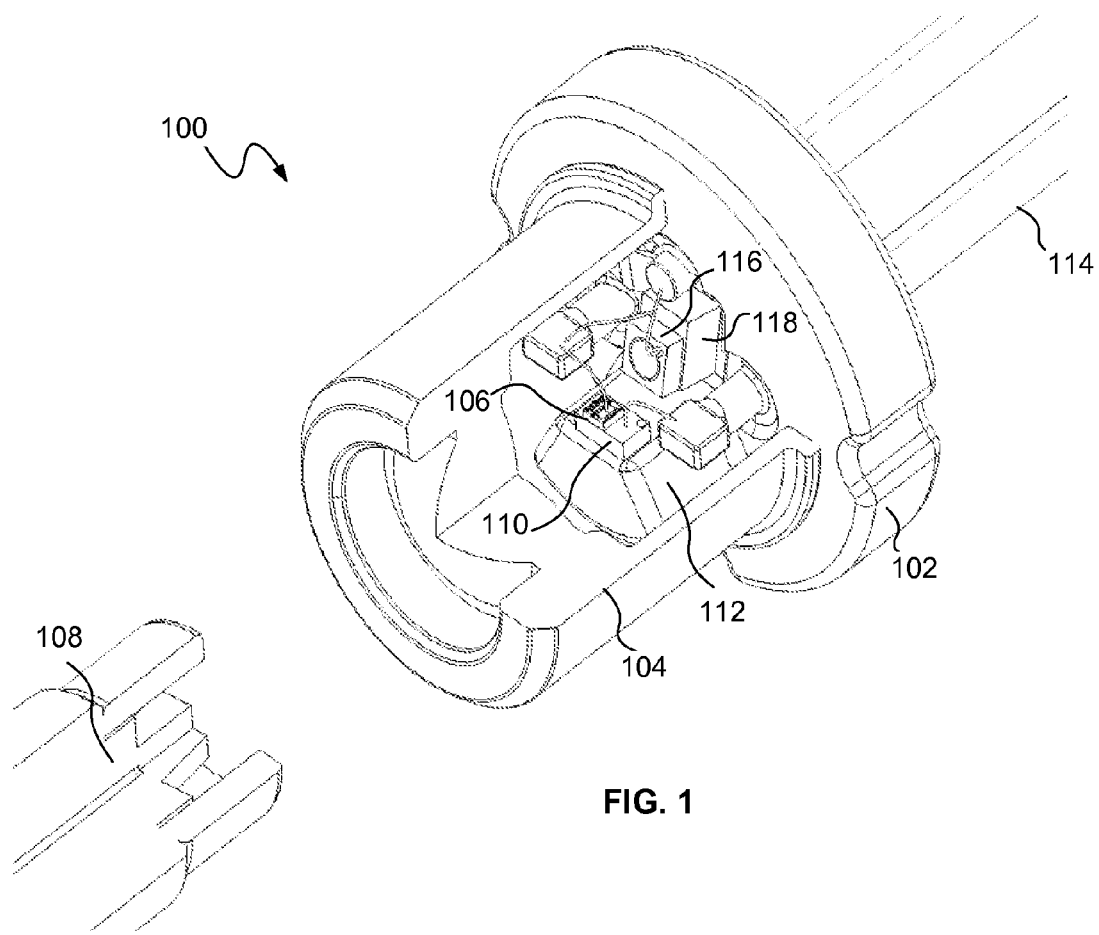
FIG. 1 is a perspective view of an optoelectronic package that may be used with a system and method for securing optoelectronic packages, consistent with one embodiment of the present disclosure.

FIG. 1 shows one example of a TO can laser package 100 that may be secured using the system and method described herein. The TO can package 100 includes a TO can header 102 and TO can housing 104. TO can housing 104 may be configured to optically couple a semiconductor laser 106 to an optical fiber 108. Laser 106 may be located in a variety of different arrangements, such as on a submount 110 disposed within the TO can housing 104.

The TO can housing 104 may align and position laser 106, optical fiber 108 and related optical components to each other so that the laser 106 may be optically coupled to the fiber 108. In some embodiments, the TO can housing 104 may be coupled to a TO can header 102 having a TO can post 112. Laser 106 may be mounted on laser submount 110 located on TO can post 112 of TO can header 102. TO can package 100 may also include one or more conductive pins 114, which may extend through TO can header 102. TO can package 100 may further include a photodetector 116, which may be coupled to a photodetector submount 118. The photodetector 116 (and the optional submount 118) may be positioned at an angle between 0° and 90° such that the photodetector 116 detects a sufficient amount of light while minimizing excessive back reflection. Of course, other configurations and arrangements are also possible. A similar TO can type laser package may also be used for a photodetector package (i.e., without a laser).

Figure 2:
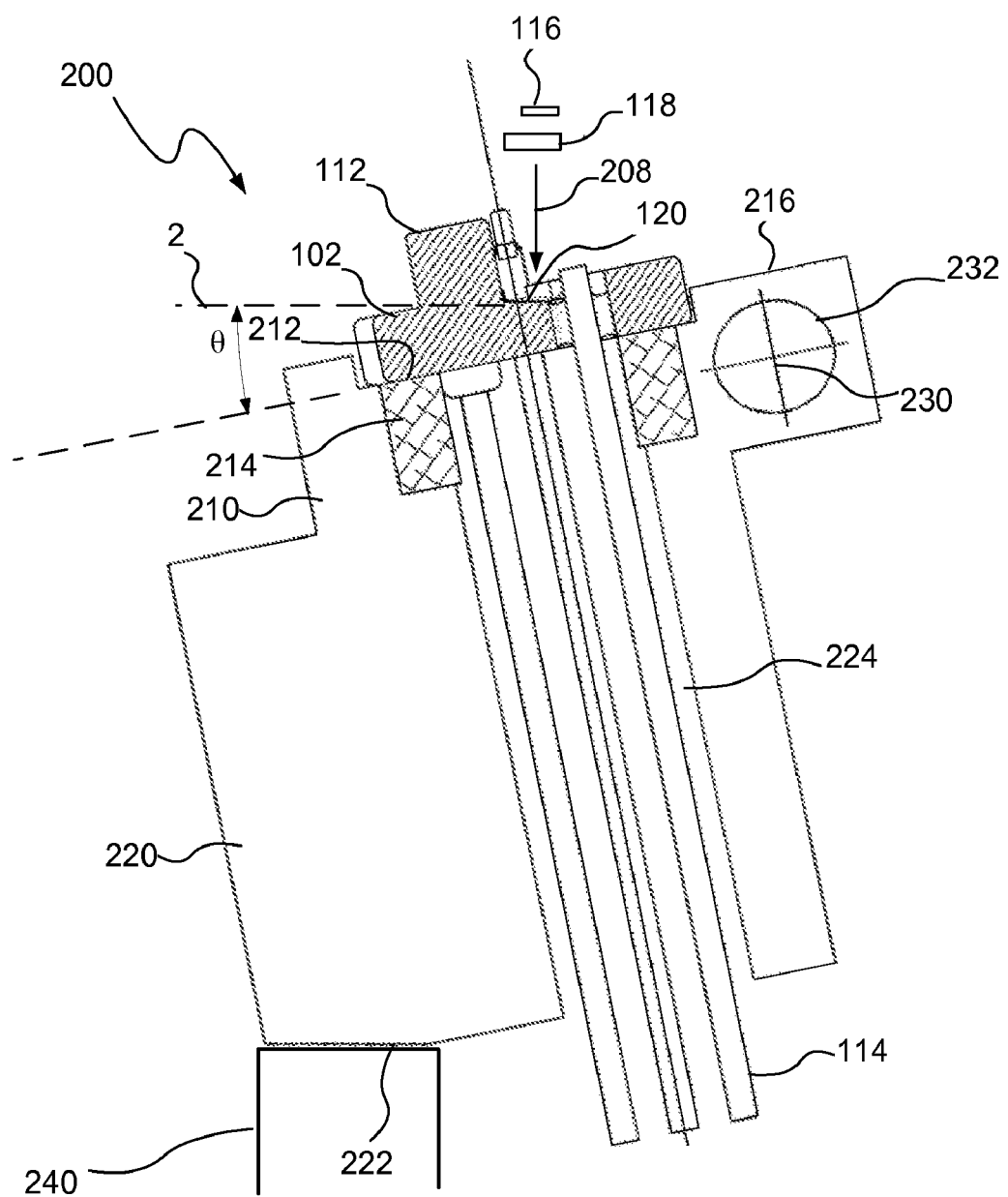
FIG. 2 is a side view of an optoelectronic package fixture, consistent with one embodiment of the present disclosure.

Referring now to FIG. 2, an exemplary embodiment of an optoelectronic package fixture 200 is shown. Optoelectronic package fixture 200 may be configured to receive and hold an optoelectronic package, such as TO can header 102 shown in FIG. 1, during mounting of one or more components at a mounting angle θ. In one example, the fixture 200 may secure the TO can header 102 for bonding the photodetector 116 (and optionally photodetector submount 118) to an angled mounting surface 120 on the TO can header 102. For a photodetector, for example, the mounting angle may be between 0° and 90° and may be selected to allow the photodetector to detect a sufficient amount of light while minimizing excessive back reflection.

Fixture 200 generally includes a top portion 210 and a bottom portion 220 defining a passageway 224 extending through both portions 210, 220. The top portion 210 includes a package supporting surface 212 that receives and supports the optoelectronic package (e.g., the TO can header 102). The passageway 224 receives the pins 114 of the optoelectronic package and may allow the pins 114 to extend beyond the bottom portion 220 of the fixture 200. The bottom portion 220 may include an angled bottom surface 222 configured to contact an abutting member 240 when the fixture 200 is in the angled position. The bottom surface 222 may form an angle relative to the package supporting surface 212, which is substantially equal to the mounting angle θ (i.e., within acceptable tolerances known to those skilled in the art). Because the bottom surface 222 forms this angle θ relative to the package support surface 212, the fixture 200 is angled at the desired mounting angle θ when the bottom surface 222 abuts the abutting member 240. When the optoelectronic package (e.g., the TO header 102) includes an angled mounting surface 120, for example, the angled mounting surface 120 may lie substantially in a horizontal plane 2 (i.e., within acceptable tolerances known to those skilled in the art) when the bottom surface 222 abuts the abutting member 240. This allows the angled components (e.g., photodetector 116 and optionally photodetector submount 118) to be mounted in a generally straight downward direction to the mounting surface 120 as indicated by arrow 208. Thus, a conventional pick and place machine may be used to mount components at the mounting angle θ.

The top portion 210 of the fixture 200 may also be pivotably mounted about a pivot point 230, which allows the fixture to pivot or swing from a non-angled position to the angled position shown in FIG. 2. In one embodiment, the top portion 210 is pivotably mounted on a shaft or axle 232. The non-angled position is generally the position when the package support surface 212 lies substantially in the horizontal plane 2 (i.e., within acceptable tolerances known to those skilled in the art). The pivot point 230 may be offset from the center of mass of the fixture 200 such that the fixture is allowed to swing freely from the non-angled position to the angled position, as will be described in greater detail below. In one embodiment, axle 232 passes through an overhanging portion 216 of the top portion 210 of the fixture 200.

The fixture 200 may also include a magnetic region 214 proximate the package supporting surface 212 to magnetically secure the optoelectronic package (e.g., the TO can header 102). According to one embodiment, using a magnetic force to secure the optoelectronic package to the fixture 200 simplifies the process of securing the packages and the structure used to secure the packages. In one embodiment, the magnetic region 214 may be formed by a magnetic ring secured within the top portion 210 of the fixture 200, for example, using any of a variety of different techniques, such as bonding, welding, etc. The magnetic region 214 may also be formed by other techniques, such as magnetization of the fixture 200. The magnetic region 214 may be constructed out of a variety of different magnetic materials. Some magnetic materials include, but are not limited to, iron, nickel, cobalt, ceramic magnets, alnico magnets, permanent, and temporary magnets. Other shapes and configurations of the magnetic region 214 are also within the scope of the present disclosure.

Figure 3A:
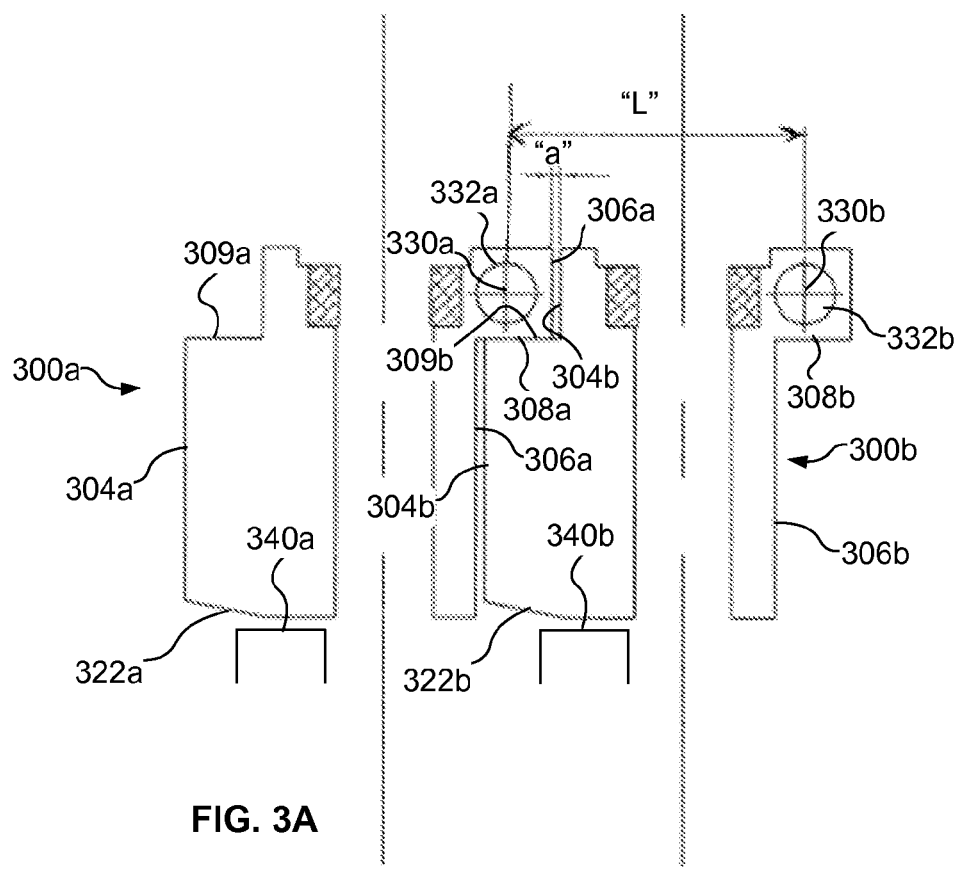
FIGS. 3A and 3B are side views of optoelectronic package fixtures in a non-angled position and an angled position, respectively, consistent with another embodiment of the present disclosure.
Figure 3B:
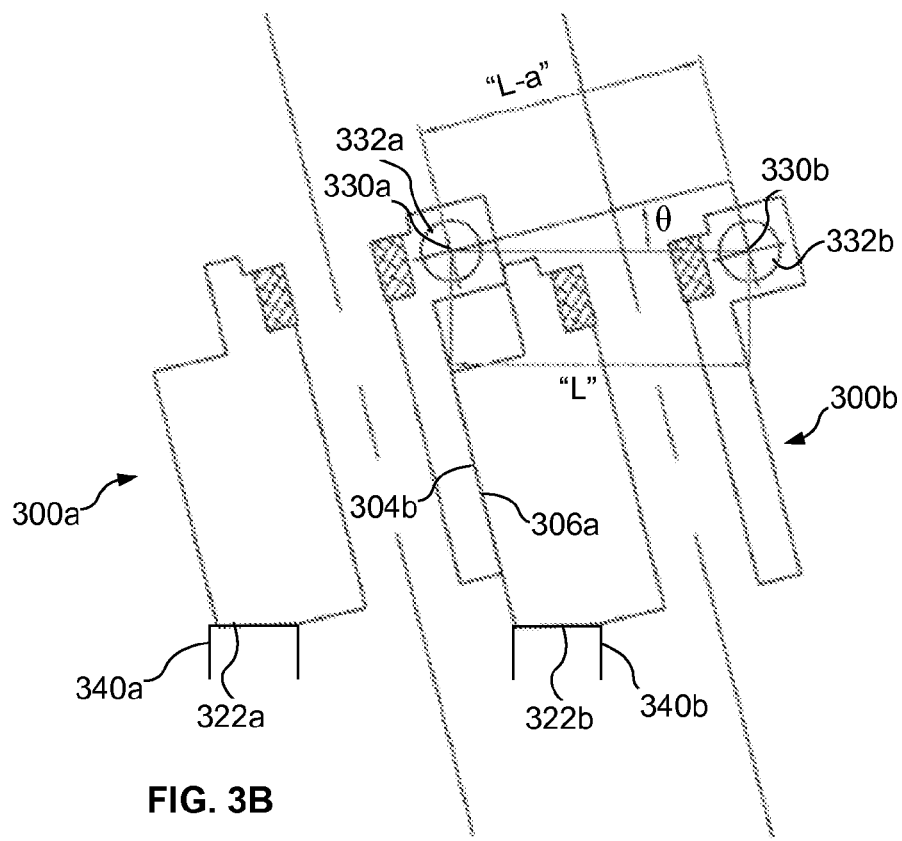

Referring now to FIGS. 3A and 3B, one embodiment of a system for securing optoelectronic packages may include a plurality of fixtures 300a, 300b pivotably mounted together. The fixtures 300a, 300b pivot in a pivot direction (e.g., counter-clockwise) from the non-angled position (FIG. 3A) to the angled position (FIG. 3B). Each of the fixtures 300a, 300b may have a structure similar to the fixture 200 shown in FIG. 2 and described above and may be pivotably mounted on respective axles 332a, 332b to allow pivoting around respective pivot points 330a, 330b. The fixtures 300a, 300b may be pivotably mounted at a pitch L, which is measured as the distance between the pivot points 330a, 330b.

The fixtures 300a, 300b may have a complimentary geometry and spacing designed to prevent the fixtures 300a, 300b from pivoting beyond the non-angled and angled positions. When the fixtures 300a, 300b are in the non-angled position (FIG. 3A), the fixtures 300a, 300b may be prevented from pivoting in a direction opposite the pivot direction. To prevent such rotation in one embodiment, the fixtures 300a, 300b may include sides 308a, 308b, 309a, 309b that engage mating sides of adjacent fixtures. In the non-angled position, for example, sides 308a, 309b of the fixtures 300a, 300b contact each other to prevent such rotation.

To prevent rotation beyond the angled position, the fixtures 300a, 300b may include first and second sides 304a, 306a, 304b, 306b. The fixtures 300a, 300b may be pivotably mounted such that there is a spacing a between sides 306a, 304b of adjacent fixtures 300a, 300b when in the non-angled position (FIG. 3A). As shown in FIG. 3B, the pitch L and spacing a may be set such that fixtures 300a, 300b are allowed to pivot the extent of the mounting angle θ (i.e., to the angled position where the bottom surfaces 322a, 322b contact abutting members 340a, 340b) before the sides 306a, 304b contact each other and prevent further rotation in the pivot direction. In one embodiment, the extent of rotation may be limited to the angle θ by setting the pitch L and spacing a according to the following equation:

$$\cos(\theta) = (L-a)/L \qquad \text{Eq. (1)}$$

This arrangement maximizes the pitch and allows an increase in the number of fixtures that may be mounted together in a system, thereby increasing the efficiency of the production line.

Referring now to FIGS. 4A-4F, one embodiment of a system 400 and method for securing optoelectronics packages is shown and described in greater detail. System 400 may include a plurality of fixtures 402a-402d pivotably mounted together and each configured to receive and secure respective optoelectronic devices (e.g., TO can headers 102a-102d), for example, as described above. The fixtures 402a-402d may be pivotably mounted between sides 450, 452 of the system 400. The sides 450, 452 of the system 400 may be configured to removably engage one or more bases, such as a first base 442 (FIGS. 4A-4D) including abutting members 440a-440d corresponding to the fixtures 402a-402d and a second base 470 (FIGS. 4E-4F) including one or more ejection members 472 described in greater detail below.

The system 400 may further include a securing mechanism 460, such as a clamp, that secures the fixtures 402a-402d in the non-angled position and prevents rotation of the fixtures 402a-402d to the angled position. In some embodiments, securing mechanism 420 may include a threaded member that is threadably received in the side 452 and engages the side of a fixture 402d. Other mechanisms capable of securing the fixtures 402a-402d against rotation may also be used.

In operation, the system 400 may be used to secure optoelectronic packages during the process of mounting components as described below in greater detail. With the fixtures 402a-402d secured in the non-angled position (FIG. 4A), a plurality of optoelectronic packages (e.g., TO can headers 102a-102d) may be secured to respective fixtures 402a-402d, for example, as described above. The secured fixtures 402a-402d may then be positioned onto the first base 442 (FIG. 4B) such that the pins 114a-114b of the optoelectronic packages are positioned between the abutting members 440a-440d. While the fixtures 402a-402d are secured in this non-angled position, certain non-angled components may be mounted to the optoelectronics packages. For example, lasers, thermistors and/or submounts (not shown) may be positioned using a pick and place machine and bonded to each of the TO can headers 102a-102d and/or TO can posts.

The fixtures 402a-402d may then be released (e.g., by releasing the securing mechanism 460) and allowed to pivot to the angled position (FIG. 4C) at which the fixtures 402a-402d abut the respective abutting members 440a-440d. As such, the fixtures 402a-402d pivot from a non-angled position to a single, fixed angled position, which is more accurate than adjusting through a range of angles. With the fixtures 402a-402d in the angled position supported on the abutting members 440a-440d, the angled components may be mounted to the optoelectronic packages. For example, the photodetectors and/or submounts may be positioned using a pick and place machine (e.g., a MRSI machine) and bonded to each of the TO can headers 102a-102d. Supporting the fixtures 402a-402d on the abutting members 440a-440d in the angled position also stabilizes the optoelectronic packages during this mounting operation.

Figure 4A:
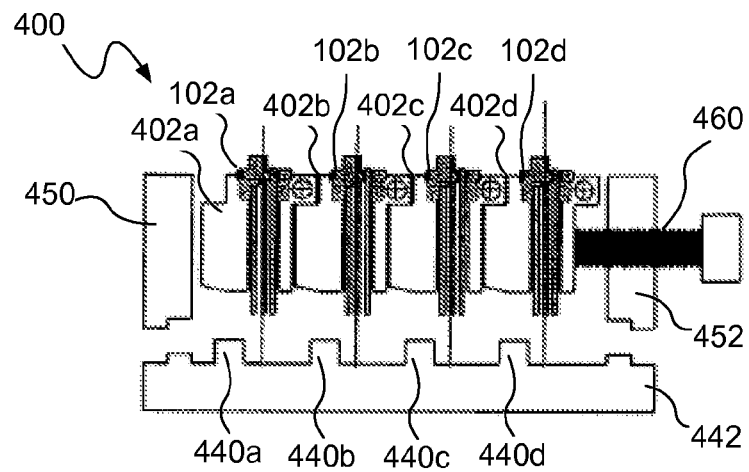
FIGS. 4A-4F are side views illustrating a method of using a system for securing optoelectronic packages, consistent with a further embodiment of the present disclosure.
Figure 4B:
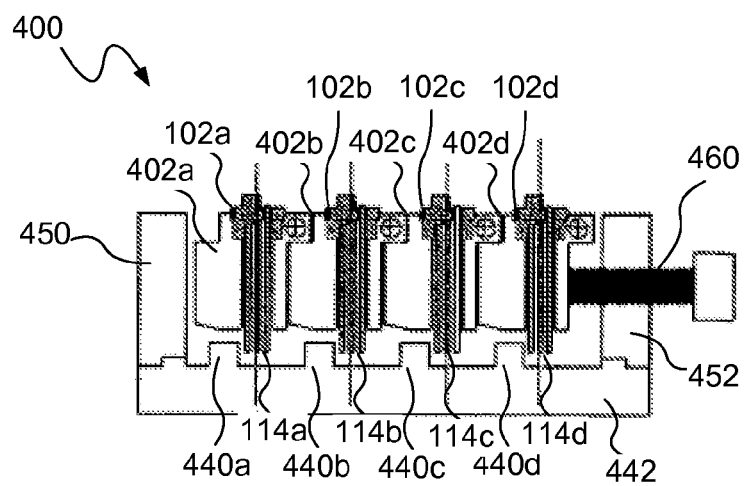
Figure 4C:
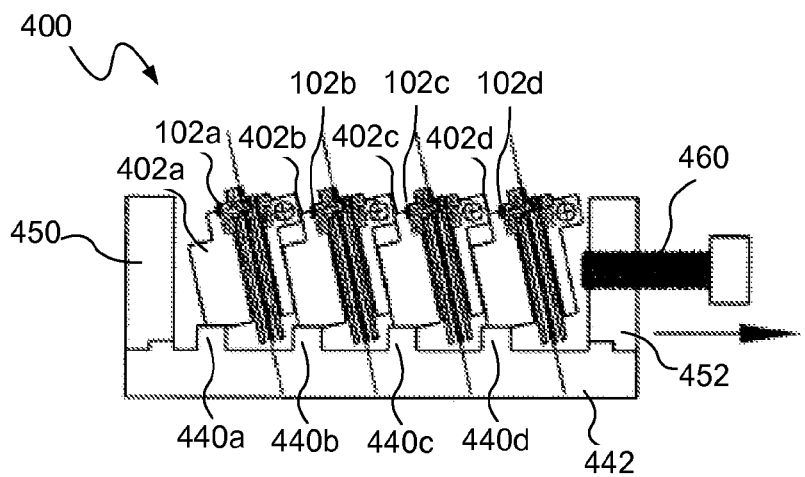
Figure 4D:
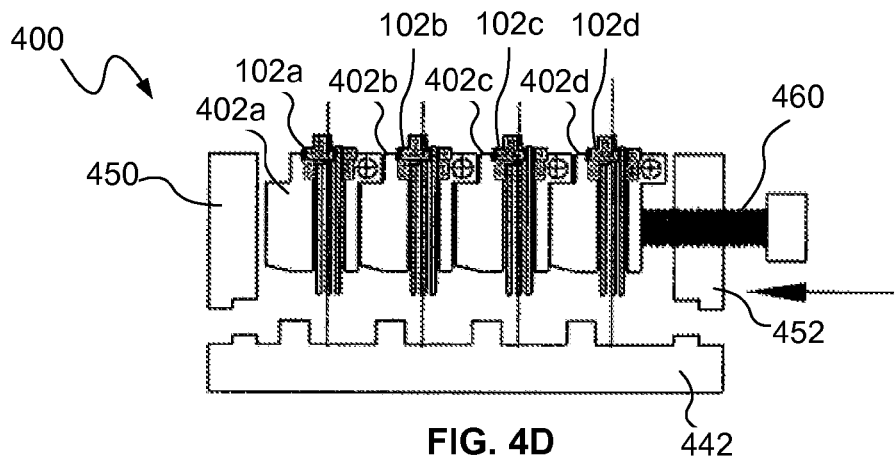
Figure 4E:
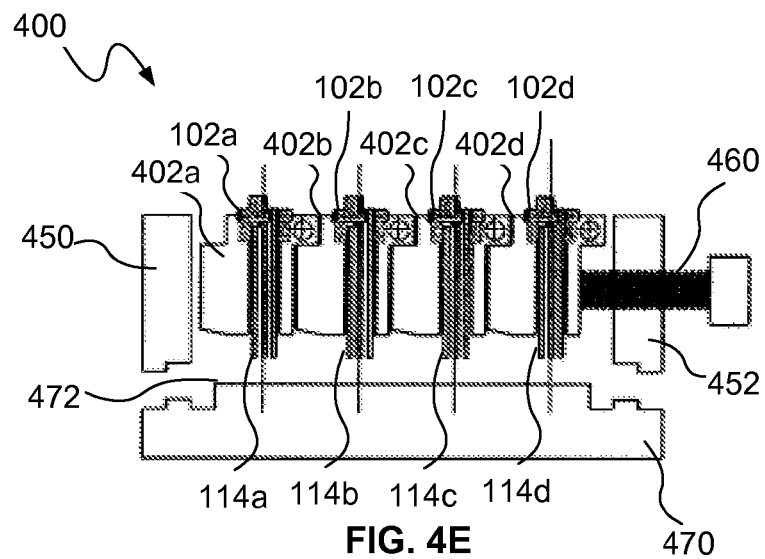
Figure 4F:
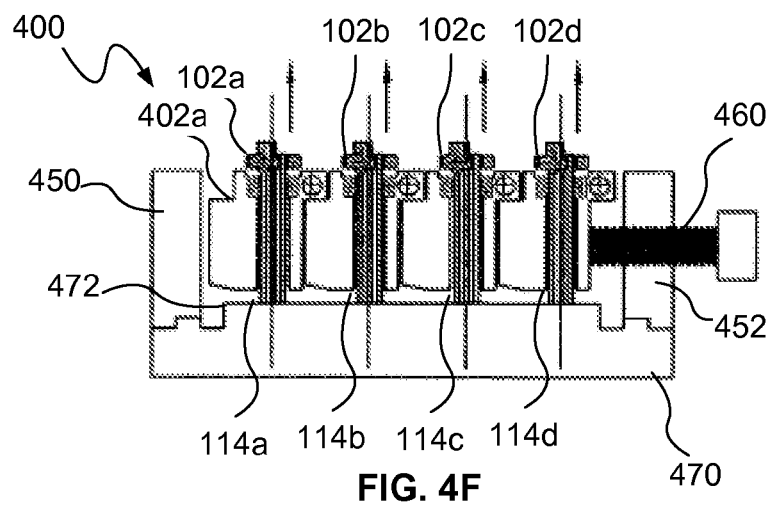

After mounting the angled components, the securing mechanism 460 may be used to secure the fixtures 402a-402d back in the non-angled position (FIG. 4D). With fixtures 402a-402d secured in the non-angled position, the fixtures 402a-402d may be removed from the first base 442 and positioned over the second based 470 (FIG. 4E). The secured fixtures 402a-402d may be moved relative to the second base 470 such that the ejection member 472 contacts the pins 114a-114d and causes the optoelectronic packages (e.g., the TO can headers 102a-102d) to disengage from the respective fixtures 402a-402d (FIG. 4F). In an embodiment with the TO can headers 102a-102d magnetically coupled to the fixtures 402a-402d, for example, the ejection member 472 may exert a force sufficient to overcome the magnetic force. The ejection of the optoelectronic packages facilitates removal of the packages from the system 400 with minimal damage to the packages.

Accordingly, the embodiments of the system and method described herein facilitate holding an optoelectronic package, such as a TO can package, during the packaging and mounting operations such as the photodetector bonding process.

Consistent with one embodiment, a system is provided for securing optoelectronic packages for mounting at least one component at a mounting angle relative to the optoelectronic package. The system includes a plurality of fixtures configured to receive and secure a plurality of optoelectronic packages. Each of the fixtures includes a package supporting surface configured to support a respective one of the optoelectronic packages. Each of the fixtures is also pivotably mounted about a pivot point that is offset from a center of mass of the fixture such that the fixtures are configured to pivot freely from a non-angled position to a single fixed angled position in which the package supporting surface of each of the fixtures forms an angle $\theta$ relative to a horizontal plane with the angle $\theta$ being substantially equal to the mounting angle. The system may also include a securing mechanism configured to secure the plurality of fixtures in the non-angled position and configured to release the plurality of fixtures to pivot to the angled position.

Consistent with another embodiment, a fixture is provided for securing an optoelectronic package for mounting at least one component at a mounting angle relative to the optoelectronic package. The fixture includes a top portion configured to receive the optoelectronic package. The top portion includes a package supporting surface configured to support the optoelectronic package, a magnetic portion configured to magnetically secure the optoelectronic package, and a pivot point configured to pivotably mount the fixture. The pivot point is offset from a center of mass of the fixture such that the fixture is configured to freely pivot from a non-angled position to an angled position. The fixture also includes a bottom portion extending from the top portion. The bottom portion includes an angled bottom surface being angled relative to the package support surface at an angle substantially equal to the mounting angle. The top portion and the bottom portion define a passageway extending through both the top portion and the bottom portion for receiving the optoelectronic package.

Consistent with a further embodiment, a method is provided for mounting at least one optoelectronic component at a mounting angle in an optoelectronic package. The method includes: securing at least one fixture in a non-angled position; securing at least one optoelectronic package to a package support surface of the at least one fixture; allowing the at least one fixture to pivot to a single fixed angled position in which the package supporting surface forms an angle relative to a horizontal plane, the angle being substantially equal to the mounting angle; and mounting the optoelectronic component to the at least one optoelectronic package while in the angled position.

While the principles of the invention have been described herein, it is to be understood by those skilled in the art that this description is made only by way of example and not as a limitation as to the scope of the invention. Other embodiments are contemplated within the scope of the present invention in addition to the exemplary embodiments shown and described herein. Modifications and substitutions by one of ordinary skill in the art are considered to be within the scope of the present invention, which is not to be limited except by the following claims.

What is claimed is:

1. A system for securing optoelectronic packages for mounting at least one component at a mounting angle relative to the optoelectronic package, the system comprising:
   a plurality of fixtures configured to receive and secure a plurality of optoelectronic packages, each of the fixtures including a package supporting surface configured to support a respective one of the optoelectronic packages, each of the fixtures being pivotably mounted about a pivot point that is offset from a center of mass of the fixture such that the fixtures are configured to pivot freely from a non-angled position to a single fixed angled position in which the package supporting surface of each of the fixtures forms an angle θ relative to a horizontal plane, the angle θ being substantially equal to the mounting angle; and
   a securing mechanism configured to secure the plurality of fixtures in the non-angled position and configured to release the plurality of fixtures to pivot to the angled position.

2. The system of claim 1, further comprising:
   at least a first base including at least one abutting member extending therefrom, said first base being configured to be positioned beneath the fixtures with the abutting member extending toward at least one of the fixtures; and
   wherein at least one of the fixtures includes an angled bottom surface configured to abut a respective one of the abutting members in the angled position, the angled bottom surface being angled relative to the package support surface at an angle substantially equal to the mounting angle.

3. The system of claim 1, wherein each of the fixtures includes a magnetic region configured to magnetically couple respective ones of the optoelectronic packages.

4. The system of claim 1, wherein each of the fixtures define a passageway extending from the package supporting surface through a fixture bottom portion and configured to receive a portion of the optoelectronic package such that the optoelectronic package extends beyond the fixture bottom portion.

5. The system of claim 1, wherein the fixtures are spaced with a spacing and a pitch that allows the fixtures to pivot to the angled position and prevents pivoting beyond the angled position.

6. The system of claim 1 wherein the fixtures have a spacing a and a pitch L, and wherein the spacing a, the pitch L, and the angle θ are related according to the equation $\cos(\theta)=(L-a)/L$.

7. The system of claim 1, wherein the fixtures are configured to receive and secure TO can type packages including a TO can header.

8. The system of claim 1, further comprising at least one axle pivotably coupling a plurality of the fixtures.

9. The system of claim 4 further comprising a second base including at least one ejection member extending therefrom, the second base being configured to be positioned beneath the fixtures such that the ejection member contacts ends of the optoelectronics packages extending beyond from the fixture bottom portion to detach the plurality of optoelectronic packages from the plurality of fixtures.

10. A fixture for securing an optoelectronic package for mounting at least one component at a mounting angle relative to the optoelectronic package, the fixture comprising:
    a top portion configured to receive the optoelectronic package, the top portion including a package supporting surface configured to support the optoelectronic package, a magnetic portion configured to magnetically secure the optoelectronic package, and a pivot point configured to pivotably mount the fixture, the pivot point being offset from a center of mass of the fixture such that the fixture is configured to freely pivot from a non-angled position to an angled position; and
    a bottom portion extending from the top portion, the bottom portion including an angled bottom surface being angled relative to the package support surface at an angle substantially equal to the mounting angle, and wherein the top portion and the bottom portion define a passageway extending through both the top portion and the bottom portion for receiving the optoelectronic package.

11. The fixture of claim 10, wherein the top portion is configured to receive a TO can type package including a TO can header.

12. The fixture of claim 10, wherein the magnetic portion includes a magnetic ring.

13. A method of mounting at least one optoelectronic component at a mounting angle in an optoelectronic package, the method comprising:
    securing at least one fixture in a non-angled position;
    securing at least one optoelectronic package to a package support surface of the at least one fixture;
    allowing the at least one fixture to pivot to a single fixed angled position in which the package supporting surface forms an angle relative to a horizontal plane, the angle being substantially equal to the mounting angle; and
    mounting an optoelectronic component in a generally straight vertical direction to the at least one optoelectronic package while the fixture is positioned in the angled position.

14. The method of claim 13, wherein securing the optoelectronic package includes magnetically coupling the at least one optoelectronic package to the at least one fixture.

15. The method of claim 13, wherein securing the at least one fixture in the non-angled position includes securing the at least one fixture with a securing mechanism, and wherein allowing the at least one fixture to pivot to the single angled position includes releasing the securing mechanism.

16. The method of claim 13, further comprising positioning the fixture over a base including at least one abutting member, and wherein the at least one fixture is allowed to pivot until a bottom surface of the fixture abuts the abutting member.

17. The method of claim 13, wherein a portion of the optoelectronic package extends through a passageway in the fixture and beyond a bottom portion of the fixture, and further comprising positioning the fixture over a base including at least one ejection member such that the ejection member ejects the optoelectronic package by exerting a force upon the optoelectronic package.

18. The method of claim 13, wherein securing the at least one fixture includes securing a plurality of fixtures pivotably mounted with a spacing and pitch.

19. The method of claim 13, wherein the optoelectronic package is a TO can type package.

20. The method of claim 13, wherein the optoelectronic component is a photodetector.

21. The method of claim 13 further comprising mounting at least one component to the package while the fixture is positioned in the non-angled position.

22. The method of claim 20 wherein the optoelectronic package is a laser package.

* * * * *